(12) United States Patent
Sullivan et al.

(10) Patent No.: US 8,010,907 B2
(45) Date of Patent: *Aug. 30, 2011

(54) AUTOMATIC 3D OBJECT GENERATION AND DEFORMATION FOR REPRESENTATION OF DATA FILES BASED ON TAXONOMY CLASSIFICATION

(75) Inventors: Andrew J. Sullivan, Wappingers Falls, NY (US); Sharad C. Sundararajan, Chestnut Hill, MA (US)

(73) Assignee: International Business Machines Corporation, Armonk, NY (US)

( * ) Notice: Subject to any disclaimer, the term of this patent is extended or adjusted under 35 U.S.C. 154(b) by 506 days.

This patent is subject to a terminal disclaimer.

(21) Appl. No.: 12/138,484

(22) Filed: Jun. 13, 2008

(65) Prior Publication Data

US 2008/0250355 A1   Oct. 9, 2008

Related U.S. Application Data

(63) Continuation of application No. 11/163,584, filed on Oct. 24, 2005, now Pat. No. 7,596,763.

(51) Int. Cl.
  *G06F 17/00* (2006.01)
(52) U.S. Cl. ............ 715/836; 715/711; 715/757
(58) Field of Classification Search ........ 715/836, 715/757, 711; 345/419, 661, 664
  See application file for complete search history.

(56) References Cited

U.S. PATENT DOCUMENTS

| | | | |
|---|---|---|---|
| 5,504,845 A | 4/1996 | Vecchione | |
| 5,831,631 A | 11/1998 | Light et al. | |
| 5,877,775 A | 3/1999 | Theisen et al. | |
| 6,111,581 A * | 8/2000 | Berry et al. | 345/419 |
| 6,240,421 B1 | 5/2001 | Stolarz | |
| 6,259,458 B1 | 7/2001 | Theisen et al. | |
| 6,301,579 B1 | 10/2001 | Becker | |
| 6,417,873 B1 | 7/2002 | Fletcher et al. | |
| 6,490,370 B1 | 12/2002 | Krasinski et al. | |
| 6,525,728 B2 | 2/2003 | Kamen et al. | |
| 6,753,863 B1 | 6/2004 | Winkler et al. | |

(Continued)

OTHER PUBLICATIONS

Leyba, T.L., Schell, D.A., "Representation of a Computer Desktop in Virtual Reality Changes to 2D," IBM Technical Disclosure Bulletin, May, 1997, vol. 40, No. 5, pp. 103-104.

*Primary Examiner* — Boris Pesin
*Assistant Examiner* — Daeho D Song
(74) *Attorney, Agent, or Firm* — Gibb I.P. Law Firm, LLC; Ian D. MacKinnon, Esq.

(57) ABSTRACT

Disclosed are a system and method for generating three-dimensional objects to represent files in a three-dimensional environment. A primary classifier classifies stored files into groups based on a first set of properties and generates three-dimensional mesh objects to represent each file. The mesh objects are the same within each group and distinguish the files from group to group. A secondary classifier further classifies each group of files into sub-groups based on a second set of properties and deforms the mesh objects in each sub-group in a particular manner to distinguish files from sub-group to sub-group. Additional classifiers modify the deformed mesh objects to further distinguish files within each sub-group (e.g., by varying the shape, texture, animation, etc.). Each three-dimensional object can then be embedded into a three-dimensional graphical user interface as a selection tool that provides visual cues regarding the contents of a particular file.

20 Claims, 10 Drawing Sheets

U.S. PATENT DOCUMENTS

| | | |
|---|---|---|
| 6,823,344 B1 | 11/2004 | Isensee et al. |
| 6,876,364 B2 | 4/2005 | Buddemeier et al. |
| 6,880,132 B2 | 4/2005 | Uemura |
| 6,885,479 B1 | 4/2005 | Pilu |
| 6,919,910 B2 | 7/2005 | Chang |
| 7,596,763 B2 * | 9/2009 | Sullivan et al. ............... 715/836 |
| 2003/0081010 A1 | 5/2003 | An Chang et al. |
| 2003/0128203 A1 * | 7/2003 | Marshall et al. ............... 345/419 |
| 2003/0142136 A1 | 7/2003 | Carter et al. |
| 2003/0164827 A1 | 9/2003 | Gottesman et al. |
| 2004/0125143 A1 | 7/2004 | Deaton et al. |
| 2005/0091596 A1 | 4/2005 | Anthony et al. |
| 2005/0210416 A1 * | 9/2005 | MacLaurin et al. .......... 715/851 |
| 2007/0094600 A1 * | 4/2007 | Sullivan et al. ............... 715/711 |

* cited by examiner

AUTOMATIC 3D OBJECT GENERATION AND DEFORMATION FOR REPRESENTATION OF DATA FILES BASED ON TAXONOMY CLASSIFICATION

CROSS-REFERENCE TO RELATED APPLICATIONS

This application is a continuation of U.S. application Ser. No. 11/163,584 filed Oct. 24, 2005.

BACKGROUND OF THE INVENTION

1. Field of the Invention

The invention generally relates to three-dimensional object generation, and, more particularly, to a system and method for automatic three-dimensional object generation for representation of files in a graphical user interface.

2. Description of the Related Art

Wide popularity of three-dimensional (3D) interfaces, in particular for gaming environments, is beginning to drive changes in non-gaming computer user interfaces. For example, it is expected that at some point in the future productive applications, such as standard operating systems and user interface environments, will adopt 3D techniques to generate truly immersive environments. As in immersive 3D gaming environments, users will be allowed to assume computer generated characters and interact within the operating and other systems in a first person visual perspective. However, in order to realize such 3D immersive environments for supporting productive applications issues relating to the 3D representation of data and interactions with that data must first be addressed. For example, one issue that must be addressed is the visual representation of files and how those visual representations are generated.

SUMMARY OF THE INVENTION

In view of the foregoing, embodiments of the invention provide a system and an associated method for automatically generating and displaying three-dimensional objects in a three-dimensional environment of a graphical user interface.

Embodiments of the system for automatically generating and displaying three-dimensional objects comprises a memory for storing files, one or more processors having multiple different classifiers for classifying the stored files according to a pre-selected taxonomy table and for automatically generating three-dimensional objects to represent those files based on the classifications, and a graphical user interface for displaying the three-dimensional objects. The system memory is adapted to store files (e.g., data files, text files, program files, etc.) having a plurality of descriptive and content-based properties (e.g., a file name, a subject, a file type, a file size and other physical statistics, a date/time of creation, a storage location, a last accessed date/time, a last modified date/time, an author, a company, etc.). The system processor(s) are in communication with the memory and comprise multiple classifiers (e.g., a primary classifier, a secondary classifier, . . . , an $n^{th}$ degree classifier). These classifiers can be adapted to access the files, to analyze the various properties of the files, and to organize the files according to the taxonomy table. For example, a classifier can be adapted to access a record of file properties to determine the statistics for that file, such as size, date/time created, etc., and to classify the file based on one or more of the statistics. Alternatively, a classifier can be configured with a data mining tool designed to scan and analyze electronic documents to determine the subject matter of the document so that the file can be classified based on subject. As the files are classified, the classifiers automatically generate, deform and modify a three-dimensional object based on a pre-selected taxonomy table to form a unique three-dimensional object to represent each file. Once generated, the unique three-dimensional objects can be embedded in a three-dimensional environment of a graphical user interface and configured as file selection tools that provide a user with visual cues regarding the contents of each file without actually having to open the file.

The system can incorporate a pre-selected taxonomy table that describes the classification principles that will be used both to both classify stored files and to generate unique three-dimensional objects for selected files based on the orderly classification. For example, the taxonomy table may set out primary classifications, the secondary classifications within the primary classifications, tertiary classifications within the secondary classifications, etc. Each degree of classifications can be based on one or more file properties (i.e., a set of properties), such as the file name, the file subject, the file type, the file size and other physical statistics, the date/time of creation, the storage location, the last accessed date/time, the last modified date/time, the author or authors, etc. The taxonomy table may also set out the shape of the object that will represent each primary classification, how each object will be deformed to represent the secondary classifications, how each object will be modified to represent the tertiary classifications, etc. The taxonomy table may be selected from one or more manufacturer-supplied taxonomy tables or may be custom-developed by a user to suit a particular application.

A primary classifier can be adapted to access the files (e.g., data files, text files, program files, etc.) that are stored in memory and to determine for each file (or for each selected file) a first set of properties related to that file, as dictated by the taxonomy table. The first set of properties can comprise a single or multiple descriptive or content-based properties of the file (e.g., the subject of the file and/or the author of the file, and/or the file type, etc.). Then, the primary classifier can group the files based on the first set of properties. The primary classifier can refer to the taxonomy table to determine what three-dimensional object should represent files from each group and generate appropriate three-dimensional objects (e.g., a three-dimensional mesh polygon with nodes for animation capability) to represent each file.

A secondary classifier can be in communication with the primary classifier and also adapted to access the files stored in memory. The secondary classifier can be adapted to determine a second set of properties for each file (or for each selected file) and to deform the three-dimensional object that was generated by the primary classifier in a particular manner based on the second set of properties, as dictated by the taxonomy table. As with the first set, the second set of properties can comprise a single or multiple descriptive or content-based properties of the file (e.g., the subject of the file and/or the author of the file, and/or the file type, etc.). For example, the taxonomy table can dictate that the secondary classification is to be based on file size, author, and file type, and that the overall size of the object may be increased or decreased to represent the size of the file, the object may be stretched or narrowed to indicate the author, and the orientation of the object may be changed to indicate the file type.

The system can also comprise additional classifiers. For example, a tertiary classifier can be in communication with the secondary classifier, a quarternary classifier can be in communication with the tertiary classifier, an $n^{th}$ degree classifier, etc. These additional classifiers can be adapted to determine additional sets of properties (e.g., a third set, a fourth set, etc.) for each file and to modify the three-dimensional object (as generated by the primary classifier and deformed by the secondary classifier) in a particular manner based on the additional set of properties, as dictated by the taxonomy table. The additional classifiers can modify the three-dimensional object in a variety of manners (e.g., by changing the color or texture of the object, by adding a sound to the object, by animating the object, etc.) to represent each tertiary, quarternary, or $n^{th}$ degree classification.

As mentioned above, once a three-dimensional object is generated, deformed, and modified, it can be embedded in a three-dimensional environment of the graphical user interface as a selection tool to provide a user with visual cues regarding the multiple different properties related to the file without actually having to open the file.

Additionally, embodiments of the computer-implemented method for automatically generating and displaying three-dimensional objects comprise providing files (e.g., data files, text files, program files, etc.) stored in memory and selecting a taxonomy table, based on which the files are to be classified. Classifiers can be used to group and sub-group the files based on the one or more properties (e.g., a file name, a subject, a file type, a file size and other physical statistics, a date/time of creation, a storage location, a last accessed date/time, a last modified date/time, an author, a company, etc.), as dictated by the taxonomy table. For example, a classifier can be adapted to access a corresponding record of properties for each file and to organize the files based on the recorded properties, as dictated by the taxonomy table. Alternatively, a classifier can be configured with a data mining tool designed to scan and analyze electronic documents so that the classifier can determine the subject matter of the document and organize the files based on subject, as dictated by the taxonomy table.

More specifically, a primary classifier can be used to automatically organize the files into groups based on a first set of properties and to generate for each file in each group a particular three-dimensional object (e.g., a three-dimensional mesh polygon with multiple nodes for animation capability), as dictated by the taxonomy table, so as to distinguish files from group to group. A secondary classifier can be used to automatically organize the files in each group into sub-groups based on a second set of properties and to deform the three-dimensional objects in each sub-group in a particular manner, as dictated by the taxonomy table, so as to distinguish files from sub-group to sub-group. Additional classifiers (e.g., a tertiary classifier, a quarternary classifier, an nth degree classifier, etc.) can be used to further classify files within each sub-group based on additional sets of properties (e.g., third or fourth sets) and to further modify the three-dimensional objects within each sub-group based on these additional sets of properties, as dictated by the taxonomy table. For example, the additional classifiers can be adapted to varying the color, texture, sound, and/or movements, of three-dimensional objects within each sub-group.

Finally, each three-dimensional object, as generated by the primary classifier, deformed by the secondary classifier, and modified by the additional classifiers, can be embedded in a three-dimensional environment of a graphical user interface as a selection tool for the file that it represents. Such selections tools are particularly useful in that they provide a user with visual cues regarding the contents of a particular file prior to selection.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned above, in order to realize three-dimensional immersive environments for supporting productive applications issues relating to the three-dimensional representation of data and interactions with that data must first be addressed. For example, one issue that must be addressed is the visual representation of files (e.g., program files, data files, text files, etc.) and how those visual representations are generated. Just as current windows-based applications use icons to visually identify such files, full three-dimensional objects can be used for the same task in a three-dimensional immersive environment. The richness of the three-dimensional immersive environments, and particularly, the complex three-dimensional representations in such environments, allow more meaningful information to be conveyed to users than the information conveyed by conventional two-dimensional icons. For example, the subject matter of an electronic file could be represented by a particularly shaped three-dimensional object, the approximate size of the electronic file could be represented by changing the size of the object, the file type could be represented by modifying the orientation of the object, etc. However, since it may be difficult for users to explicitly create each three-dimensional representation, there is a need for an automated system and method for generating three-dimensional objects and for displaying those objects in a graphical user interface. In view of the foregoing, disclosed herein are embodiments of a system and an associated method for automatically generating and displaying three-dimensional objects in a graphical user interface.

Figure 1:
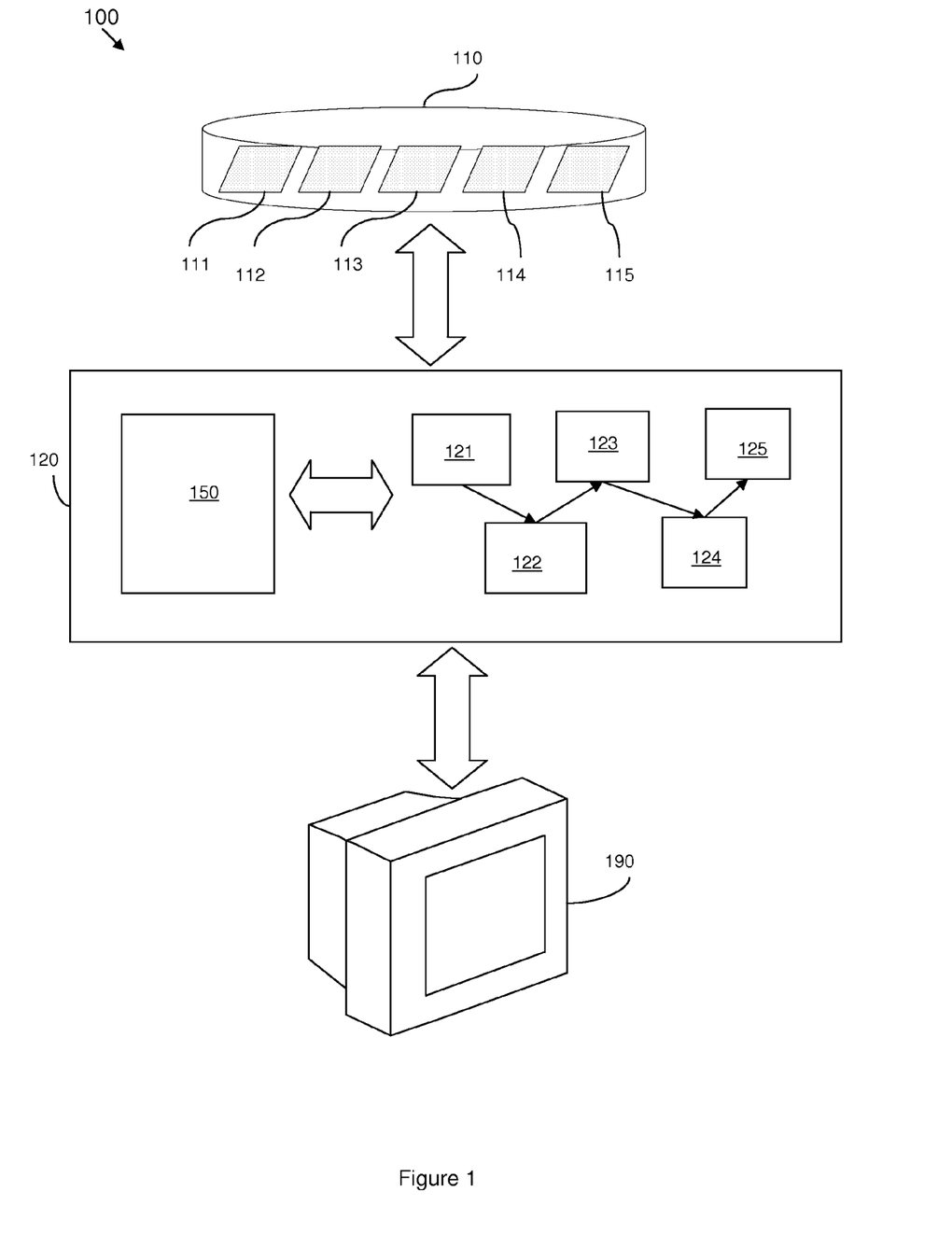
FIG. 1 is schematic block diagram illustrating an embodiment of a system of the invention.

More particularly, referring to FIG. 1, embodiments of the system 100 for automatically generating and displaying three-dimensional objects comprises a memory 110 for storing files or folders (i.e., files or sets of multiple files, hereinafter referred to as files 111-115), one or more processors 120 having multiple different classifiers 121-124 for classifying the stored files 111-115 according to a pre-selected taxonomy table 150 and for automatically generating three-dimensional objects to represent those files based on the classifications, and a graphical user interface 190 for displaying the three-dimensional objects.

The system memory 110 (e.g., a database management system, a federated database management system, a hard drive, a disk, data storage device, etc.) is adapted to store files 111-115 (e.g., data files or folders containing data files, text files or folders containing text files, program files or folders containing program files, etc.) that have a plurality of descriptive and content-based properties (e.g., a file/folder name, a subject, a file types, a file size and other physical statistics, a date/time of creation, a storage location, a last accessed date/time, a last modified date/time, an author, a company, etc.).

The system processor(s) 120 are in communication with the memory 110 and comprise multiple different classifiers (e.g., a primary classifier 121, a secondary classifier 122, a tertiary classifier 123, a quarternary classifier 124, . . . , an $n^{th}$ degree classifier 125, etc.). These classifiers 121-125 can be adapted to access the files 111-115, to analyze the various properties of the files, and to classify the files, as dictated by the taxonomy. Those skilled in the art will recognize that a variety of known techniques can be used to automatically classify and organize files. For example, for each file 111-115 a classifier can access a corresponding record of properties to determine the statistics for that file or folder, such as size, date/time created, etc., and then classify the file based on the statistics. Alternatively, a classifier can be configured as a data mining classifier designed to analyze electronic documents to determine the subject matter of those documents and to classify the documents accordingly. As the files 111-115 are classified, the classifiers 121-125 automatically generate, deform and modify three-dimensional objects for each file based on a pre-selected taxonomy table in order to form a unique three-dimensional object for each file. Once generated, a unique three-dimensional object can be embedded in a three-dimensional environment of a graphical user interface 190 and configured as a file or folder selection tool that provides a user with visual cues regarding the contents of the file or folder (e.g., the subject, file type, author, size, etc., of a particular program, text or data file).

Specifically, the system 100 can incorporate processor(s) 120 that allow a user to select either an application-appropriate pre-programmed taxonomy table 150 or to custom-design an application-specific taxonomy table. The taxonomy table 150 describes the classification principles that will be used both to automatically classify stored files 111-115 and to generate unique three-dimensional objects for selected files based on the classification. Thus, the taxonomy table 150 may set out the primary classifications, the secondary classifications within the primary classifications, tertiary classifications within the secondary classifications, etc. Each classification can be based on one or more properties (i.e., a set of properties), such as the file name, the file subject, the file type, the file size and other physical statistics, the date/time of creation, the storage location, the last accessed date/time, the last modified date/time, the author or authors, etc. Some or all of the attributes of the files may be used to classify the files, as dictated by the taxonomy table. The taxonomy table 150 may also set out the shape of the object that will represent each primary classification, how each object will be deformed to represent a secondary classification, how each object will be modified to represent a tertiary classification, etc.

Figure 2:
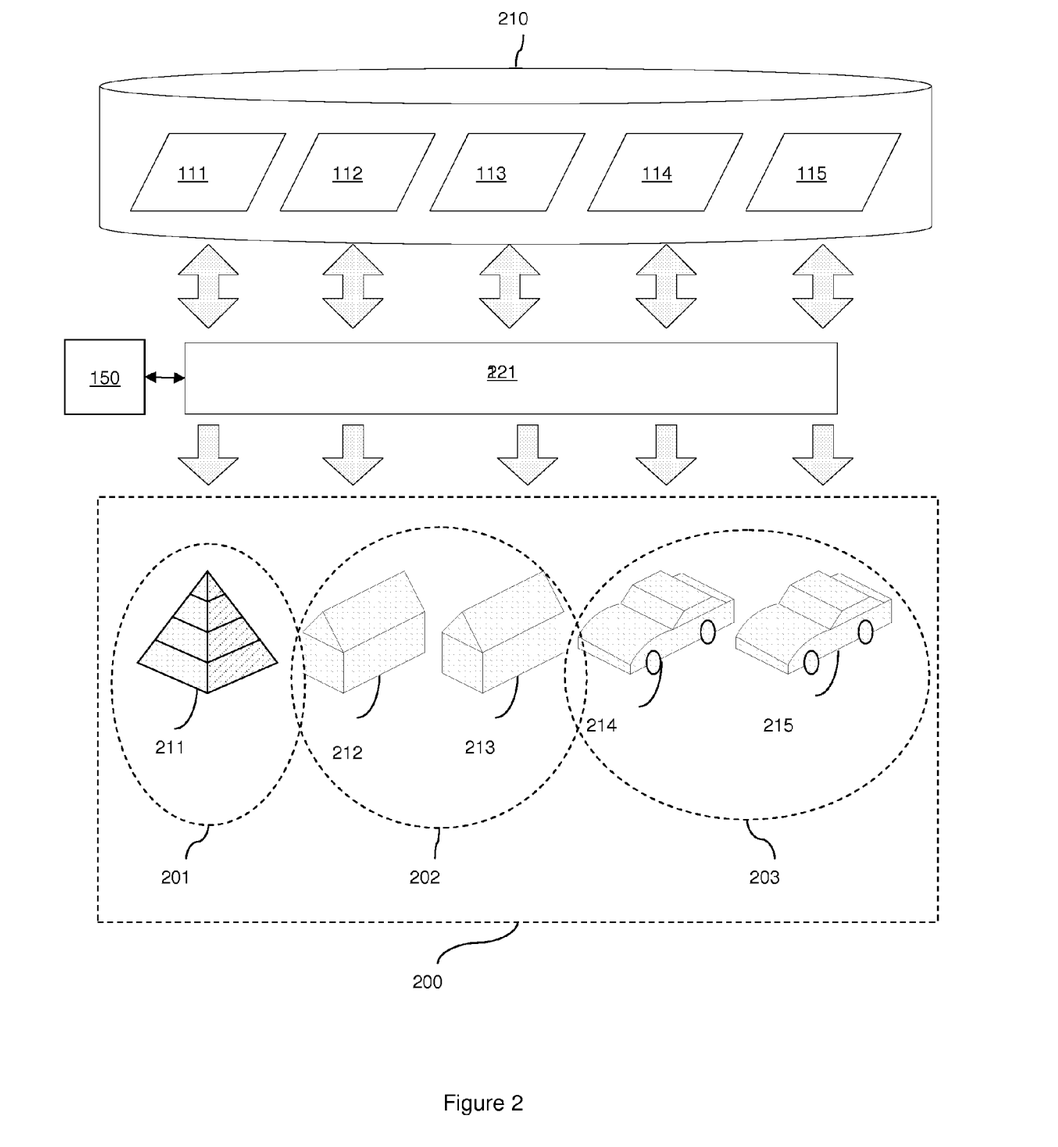
FIGS. 2-6 are schematic block diagrams illustrating the operation of the system of Figure.

Referring to FIG. 2, the primary classifier 121 of the system 100 can be adapted to access the files 111-115 (e.g., data files, text files, program files, etc.) that are stored in memory 110 and to determine for each file 111-115 (or for each selected file) a first set of properties related to that file. The first set of properties can comprise a single or multiple descriptive or content-based properties of the file (e.g., the subject of the file and/or the author of the file, and/or the file type, etc.), as dictated by the taxonomy table 150. Then, the primary classifier 121 can organize the files into groups 201-203 based on the first set of properties (i.e., the primary classification 200). The primary classifier 121 can refer to the taxonomy table 150 to determine what three-dimensional object should represent files from each group 201-203 and generate appropriate three-dimensional objects 211-215 to represent each file (i.e., map the primary classification to a 3D object). Those skilled in the art will recognize that a variety of known techniques can be used to generate 3D objects and that these known techniques often represent 3D environments, including 3D objects, characters and scenery, using mesh polygons that have skeletal structures (e.g., nodes) that allow for various animation capabilities. Thus, as illustrated in FIG. 2, the taxonomy table can dictate that the file 211 in a first group 201 may be represented by a 3D mesh pyramid, the files 212-213 in a second group 202 may be represented by a 3D mesh building, the files 214-215 in a third group 203 may be represented by a 3D mesh car, etc. Those skilled in the art will further recognize that the mapping function can be accomplished using any known function which assigns mesh objects to files.

Figure 3:
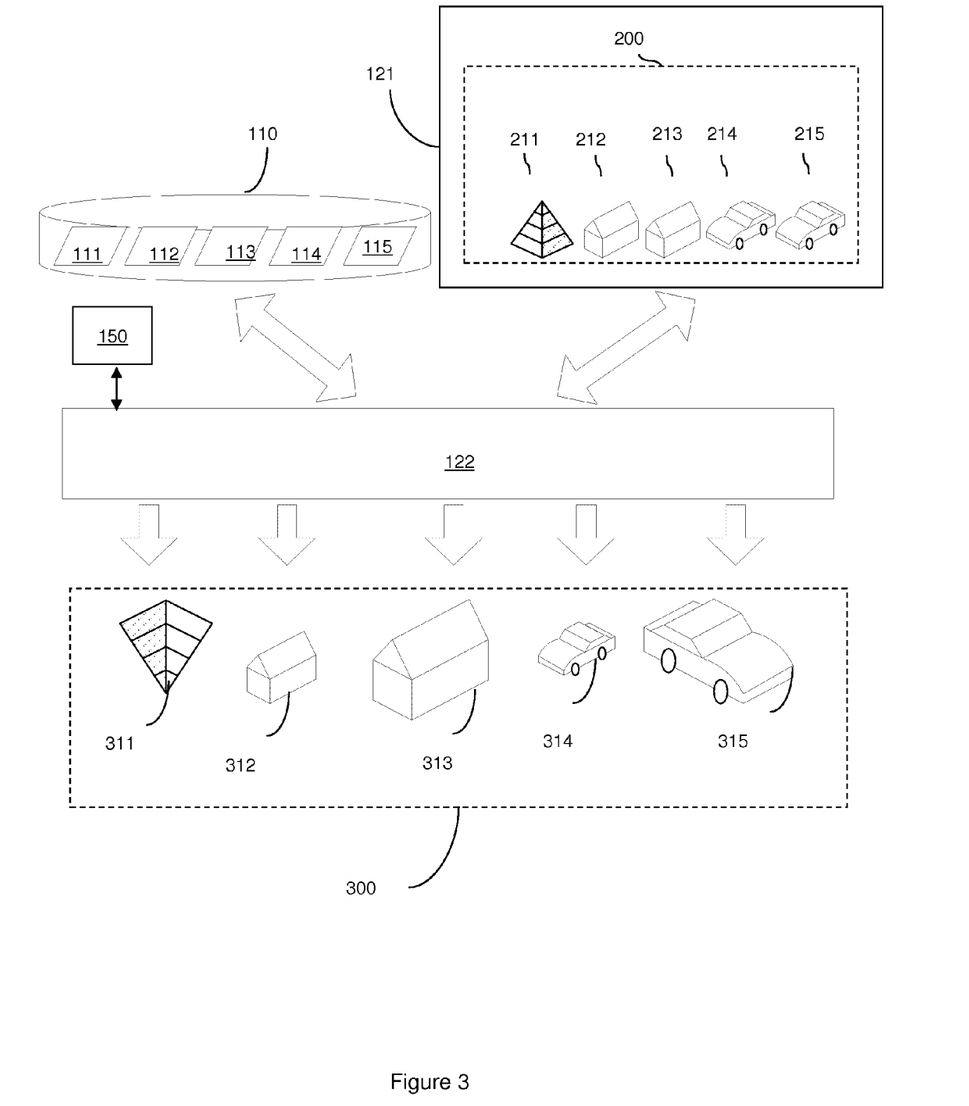

Referring to FIG. 3, the system 100 can further comprise a secondary classifier 122 in communication with the primary classifier 121 and also adapted to access the files 111-115 stored in memory 110. The secondary classifier 122 can be adapted to determine a second set of properties for each file 111-115 (or for each selected file) and to deform the three-dimensional objects that were generated by the primary classifier 121 in a particular manner based on the second set of properties. As with the first set of properties, the second set of properties can comprise a single or multiple descriptive or content-based properties of the file (e.g., the subject of the file and/or the author of the file, and/or the file type, etc.), as dictated by the taxonomy table 150. Specifically, the secondary classifier 122 can be adapted to organize each group 201-203 from the primary classification 200 into sub-groups based on the second set of properties and then, to deform the three-dimensional objects 211-215 in each sub-group in a particular manner to represent the secondary classification 300 (see deformed 3D objects 311-315). Thus, once objects are represented using polygon meshes, the meshes can be deformed to create similar but different variants of that object, as dictated by the taxonomy table. For example, the taxonomy table can dictate that the second classification is to be based on file size, author, and file type, and that the overall size of the object may be increased or decreased to represent the size of the file, the object may be stretched or narrowed to indicate the author, and the orientation of the object may be changed to indicate the file type.

Figure 4:
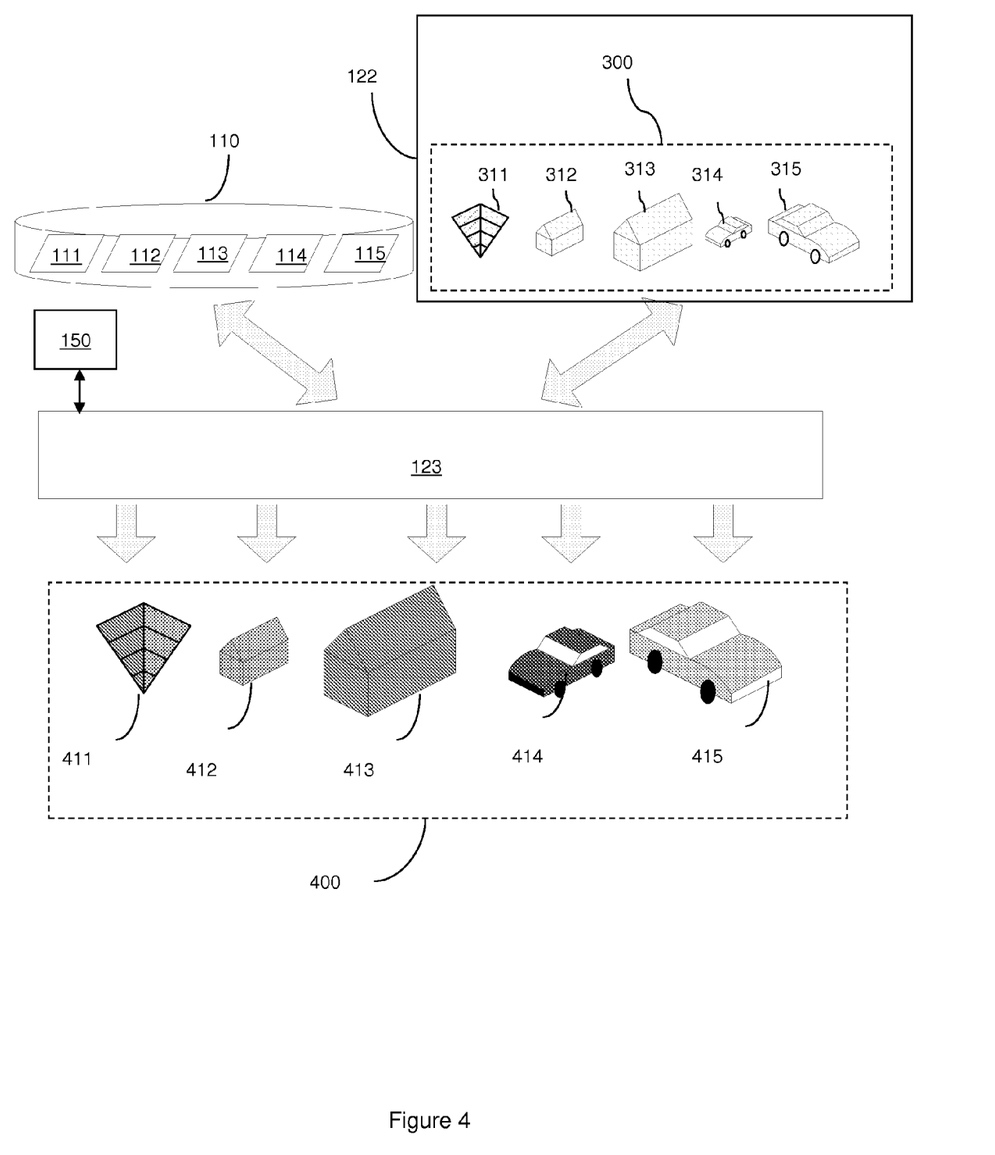
Figure 5:
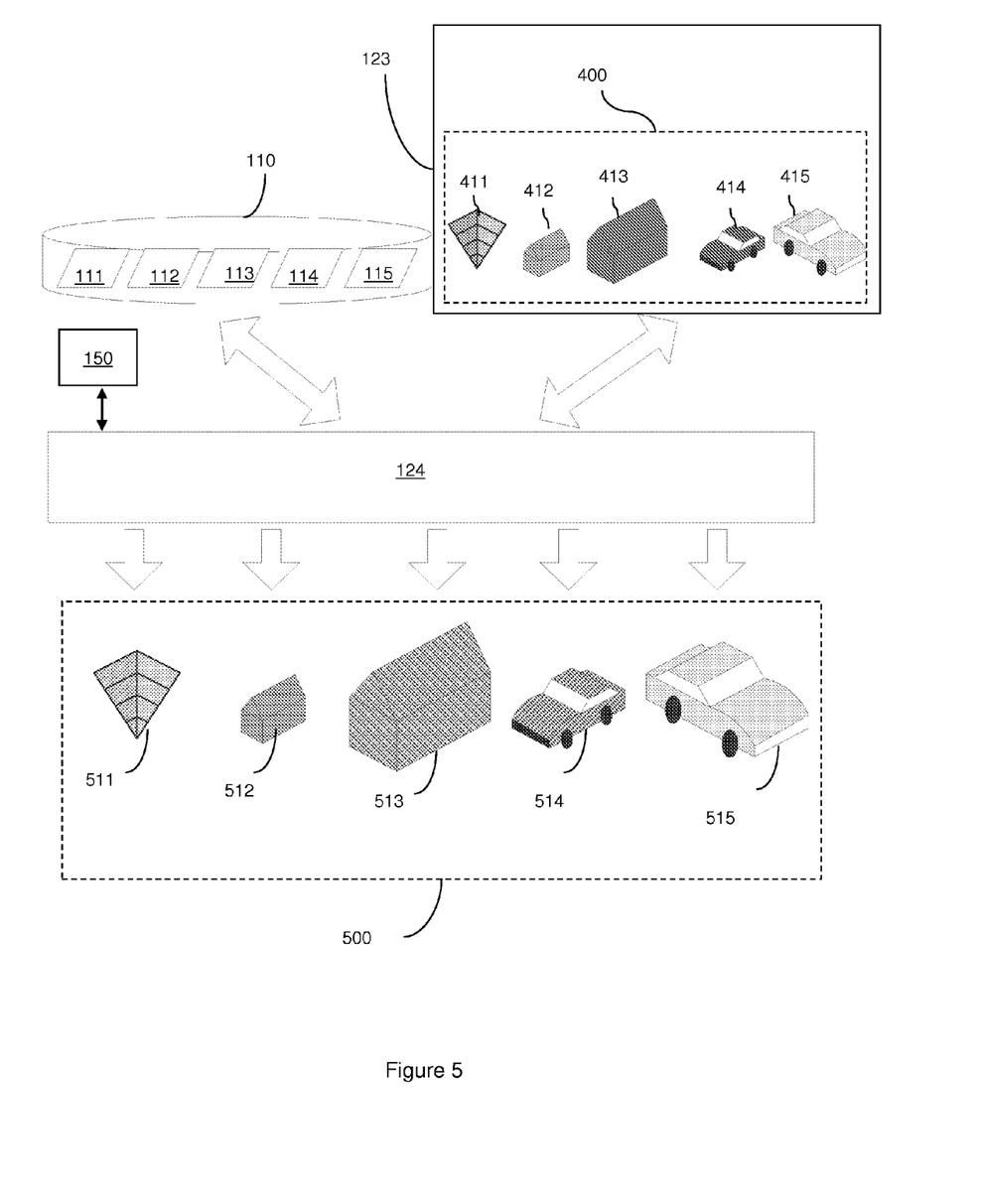
Figure 6:
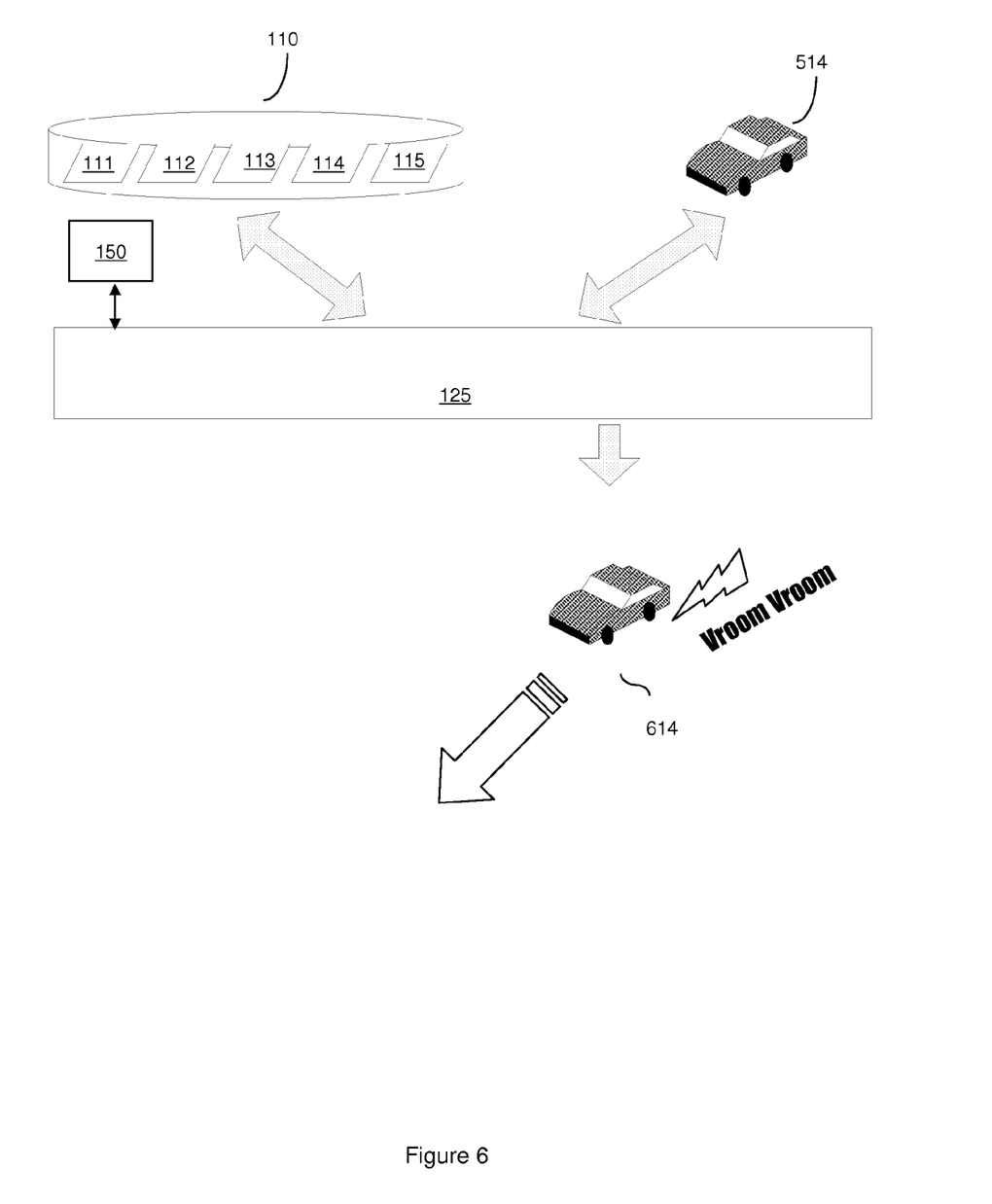

Referring to FIGS. 4-6 in combination, the system 100 can further comprise a tertiary classifier 123 in communication with the secondary classifier 122, a quarternary classifier 124 in communication with the tertiary classifier 123, an $n^{th}$ degree classifier 125, etc. These additional classifiers 123-125 can be adapted to determine additional sets of properties (e.g., a third set, a fourth set, etc.) for each file 111-115 (or for each selected file) and to modify the three-dimensional object (as generated by the primary classifier 121 and deformed by the secondary classifier 122) in a particular manner based on the additional sets of properties. As with the first and second sets of properties, the additional sets of properties can each comprise a single or multiple descriptive or content-based properties of the file (e.g., the subject of the file and/or the author of the file, and/or the file type, etc.) as dictated by the taxonomy table. Using these additional classifiers, the three-dimensional object can be modified in a variety of different manners.

For example, FIG. 4 illustrates a tertiary classifier 123 in communication with the secondary classifier 121 and also adapted to access the files 111-115 stored in memory 110. The tertiary classifier 122 can be adapted to determine a third set of properties for each file 111-115 and to modify, for example, the color of the three-dimensional objects 311-315 that were generated by the secondary classifier 122 based on the third set of properties. Specifically, the tertiary classifier 123 can be adapted to organize each sub-group from the secondary classification 300 into further sub-groups based on the third set of properties and then, to modify the color of the three-dimensional objects 311-315 in the various sub-groups to represent the tertiary classification 400 (see modified 3D objects 411-415).

Similarly, FIG. 5 illustrates a quarternary classifier 124 in communication with the tertiary classifier 123 and also adapted to access the files 111-115 stored in memory 110. The quarternary classifier 124 can be adapted to determine a fourth set of properties for each file 111-115 and to modify, for example, the texture of the three-dimensional objects 411-415 that were generated by the tertiary classifier 123 based on the fourth set of properties. Specifically, the quarternary classifier 124 can be adapted to organize each sub-group from the tertiary classification 400 into further sub-groups based on the fourth set of properties and then, to modify the texture of the three-dimensional objects 411-415 in the various sub-groups to represent the quarternary classification 500 (see further modified 3D objects 511-515).

FIG. 6 illustrates an additional classifier 125 that can also be adapted to access the files 111-115 stored in memory 110 and to further classify the files based on the taxonomy table 150. This additional classifier 125 can be adapted to determine an additional set of properties for each file 111-115 and to add sound and/or animation to a three-dimensional object based on the additional set of properties, as dictated by the taxonomy table 150. For example, the taxonomy table 150 can dictate that a three-dimensional object (e.g., a car 514) can be animated to illustrate one property (e.g., that the document is a draft) and with sounds to indicate another property (e.g., a high priority for completion) (e.g., see car 614).

Figure 7:
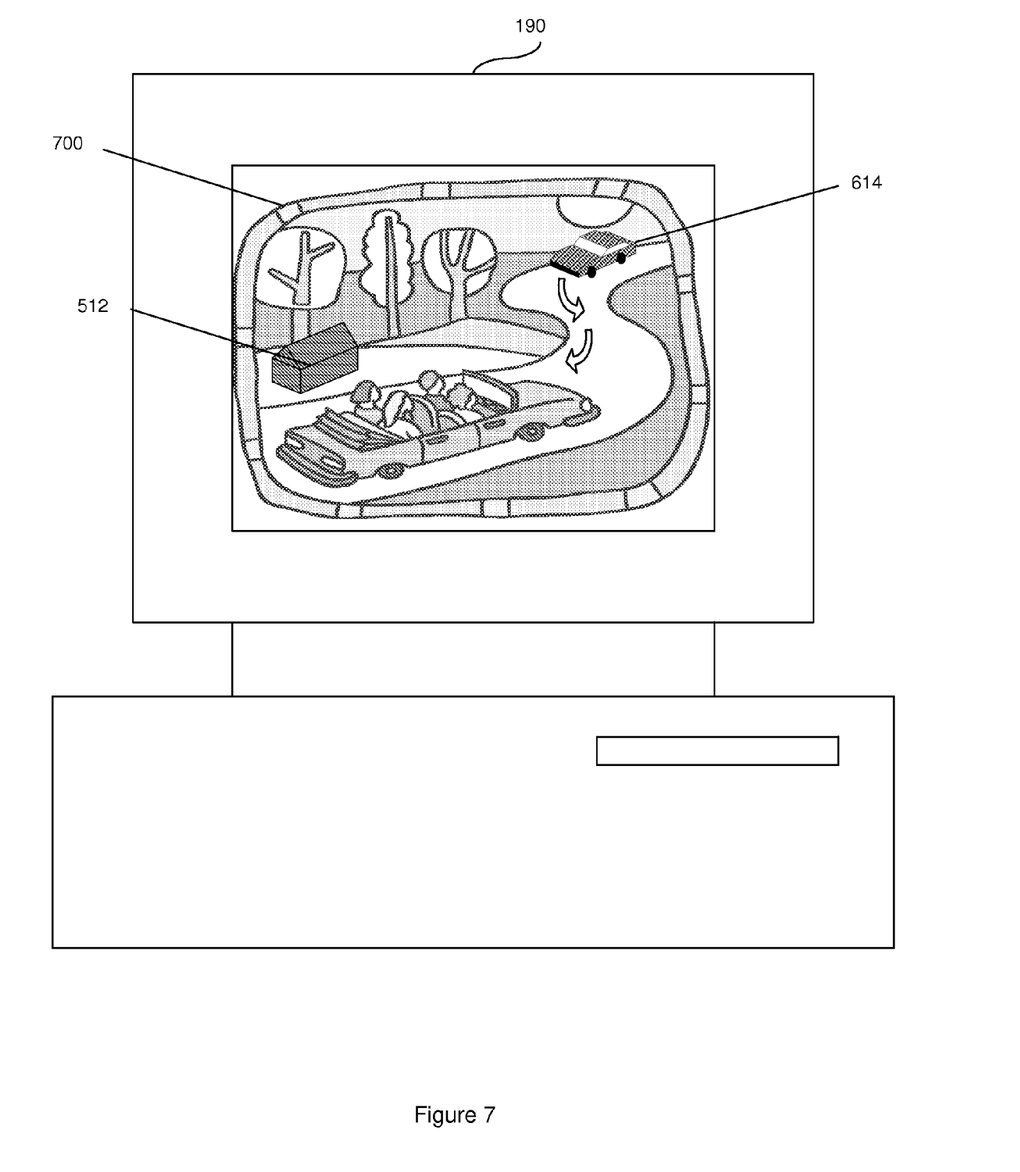
FIGS. 7-8 illustrate an exemplary graphical user interface for use in the system of FIG. 1.
Figure 8:
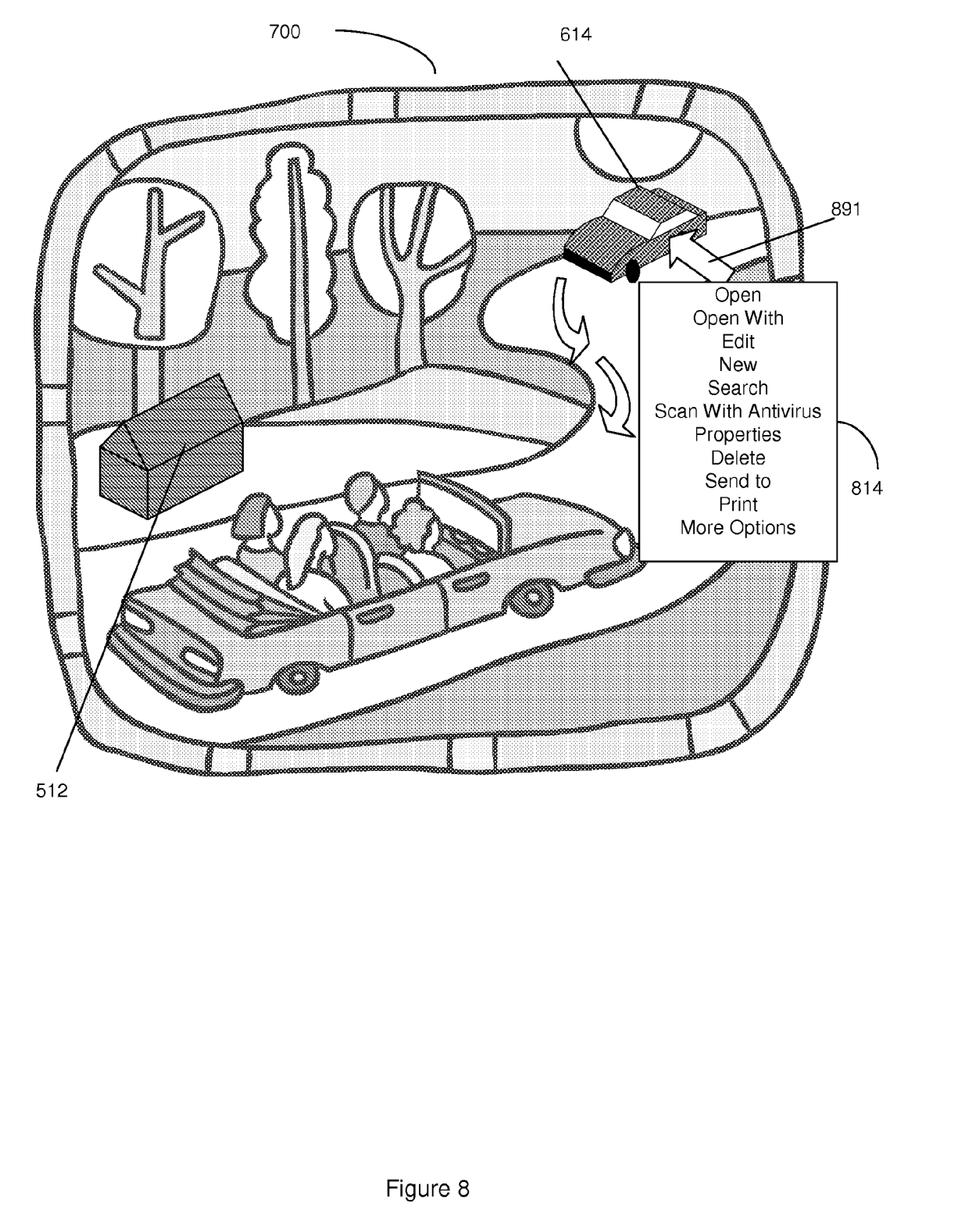

Referring to FIGS. 7-8, as mentioned above, the system 100 can further be configured with technology that allows the three-dimensional objects (e.g., see objects 614 and 512) to be embedded in a three-dimensional environment 700 of a graphical user interface 190 and used as selection tools. For example, each three-dimensional object (e.g., object 614) can be used to open a corresponding file by left clicking the cursor 891 on the object or to open an options window 814 by right-clicking the cursor 891 on the object. However, before opening the file or the options window, the three-dimensional object itself, as generated, deformed, and modified by the classifiers 121-125, provides visual cues to a user regarding multiple different properties (e.g., a file name, a subject, a file type, a file size and other physical statistics, a date/time of creation, a storage location, a last accessed date/time, a last modified date/time, an author, a company, etc.) related to that particular file.

Figure 9:
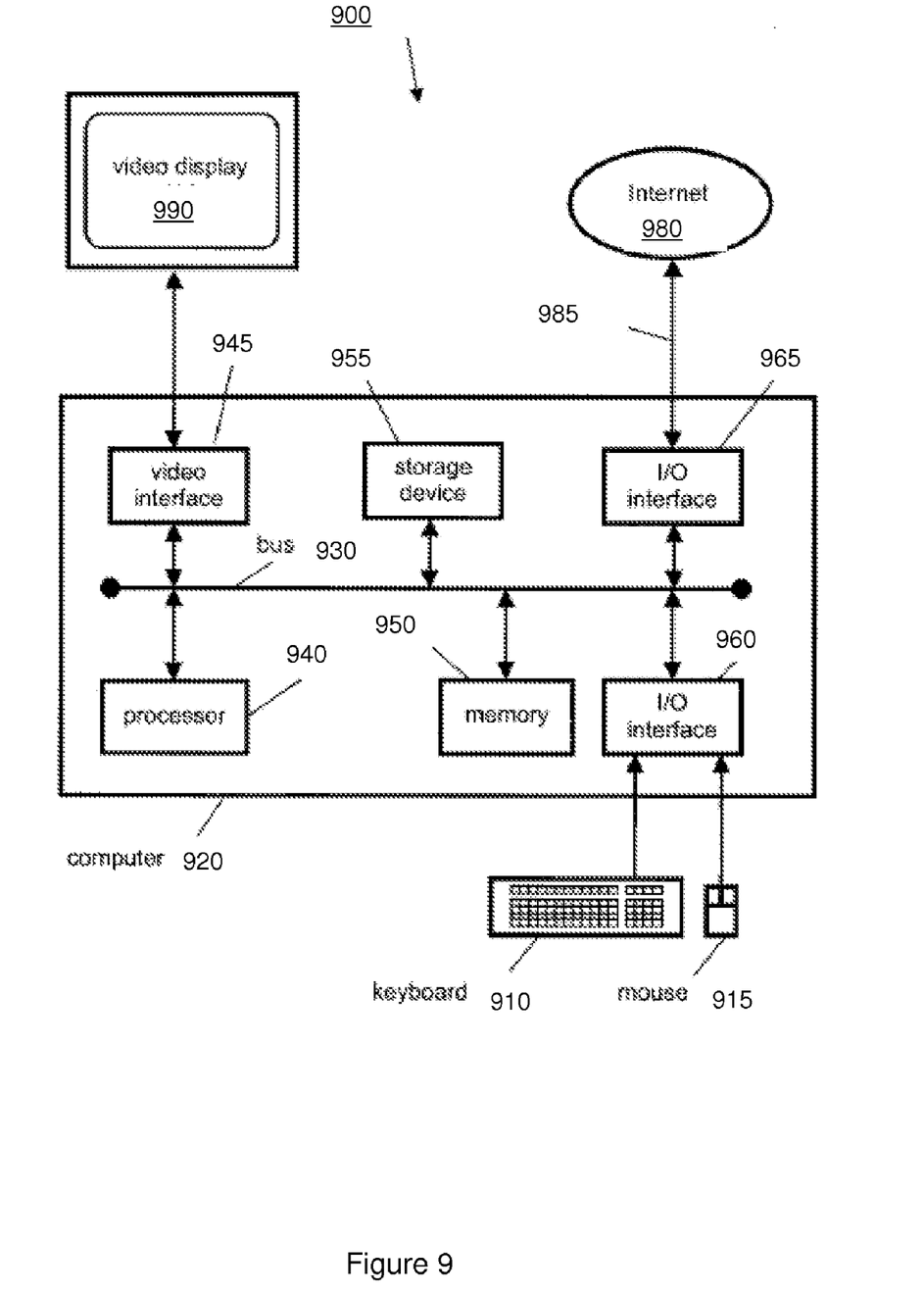
FIG. 9 is a schematic representation of a computer system suitable for generating and displaying three-dimensional objects as described herein.

FIG. 9 is a schematic representation of a computer system 900 that can be used for automatically generating and displaying three-dimensional objects as described herein. Computer software executes under a suitable operating system installed on the computer system 900 to assist in performing the described techniques. This computer software is programmed using any suitable computer programming language, and may be though of as comprising various software code means for achieving particular steps. The components of the computer system 900 include a computer 920, a keyboard 910 and a mouse 915, and a video display 990. The computer 920 includes a processor 940, a memory 950, input/output (I/O) interfaces 960, 965, a video interface 945, and a storage device 955. The processor 940 is a central processing unit (CPU) that executes the operating system and the computer software executing under the operating system. The memory 950 includes random access memory (RAM) and read-only memory (ROM), and is used under direction of the processor 940. The video interface 945 is connected to video display 990. User input to operate the computer 920 is provided from the keyboard 910 and mouse 915. The storage device 955 can include a disk drive or any other suitable storage medium. Each of the components of the computer 920 is connected to an internal bus 930 that includes data, address, and control buses, to allow components of the computer 920 to communicate with each other via the bus 930. The computer system 900 can be connected to one or more other similar computers via input/output (I/O) interface 965 using a communication channel 965 to a network, represented as the Internet 980. The computer software may be recorded on a portable storage medium, in which case, the computer software program is accessed by the computer system 900 from the storage device 955. Alternatively, the computer software can be accessed directly from the Internet 980 by the computer 920. In either case, a user can interact with the computer system 900 using the keyboard 910 and mouse 915 to operate the programmed computer software executing on the computer 920. Other configurations or types of computer systems can be equally well used to implement the described techniques. The computer system 900 described above is described only as an example of a particular type of system suitable for implementing the described techniques.

Figure 10:
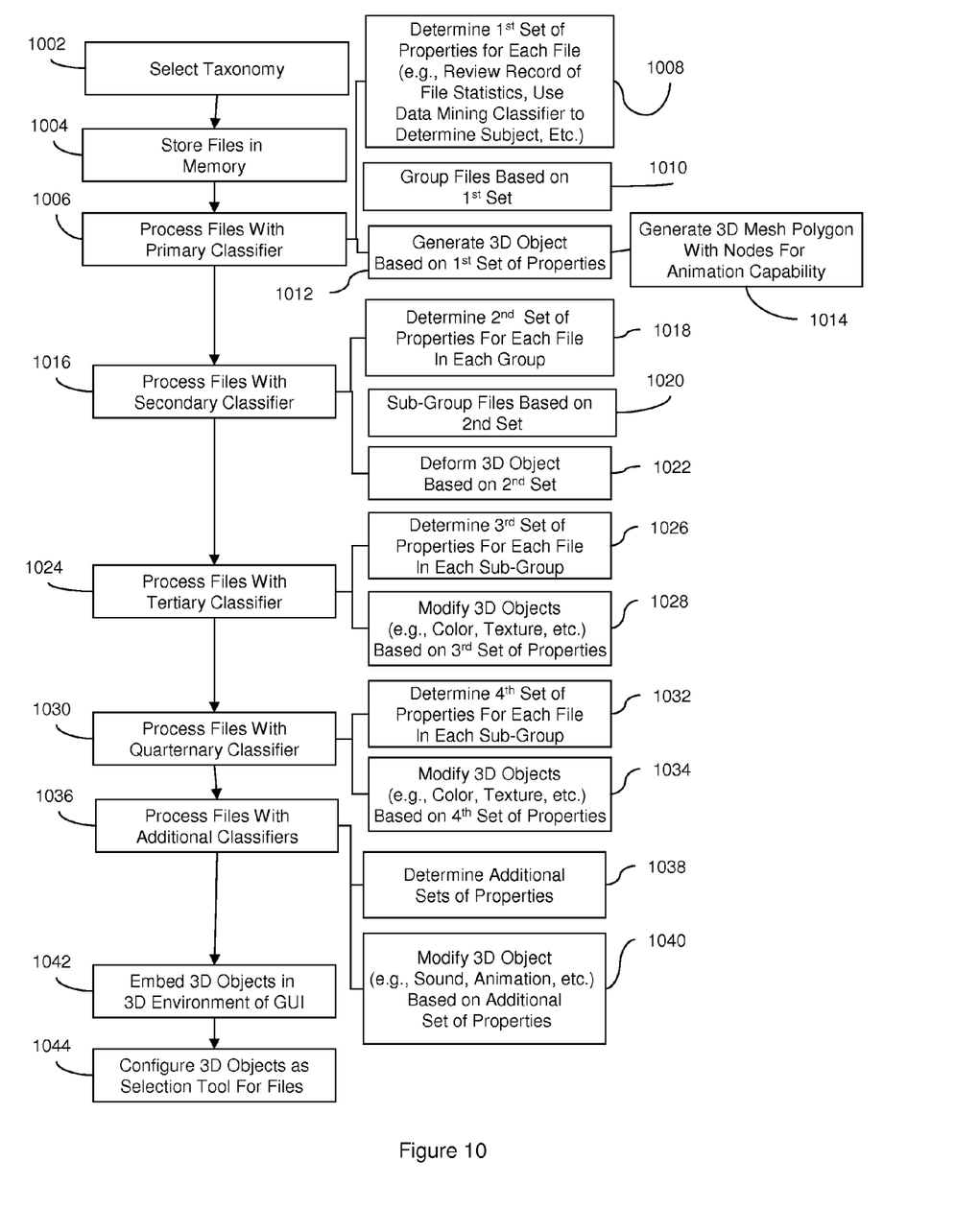
FIG. 10 is a schematic flow diagram illustrating an embodiment of a method of the invention.

FIG. 10 illustrates a schematic flow diagram of a computer-implemented method for automatically generating and displaying three-dimensional objects based on a pre-selected taxonomy table.

More particularly, referring to FIGS. 1-8 in combination with FIG. 10, the method comprises selecting a taxonomy table that describes the classification principles that will be used both to classify stored files 111-115 automatically and in an orderly manner and to generate unique three-dimensional objects for selected files based on the orderly classification (1000). Thus, the taxonomy table 150 may set out the primary file classifications, the secondary file classifications within the primary classifications, tertiary file classifications within the secondary classifications, etc. Each classification can be based on one or more file properties (i.e., a set of properties), such as the file name, the file subject, the file type, the file size and other physical statistics, the date/time of creation, the storage location, the last accessed date/time, the last modified date/time, the author or authors, etc. The taxonomy table 150 may also set out the shape of the object that will represent each primary classification, how each object will be deformed to represent a secondary classification, how each object will be modified to represent a tertiary classification, etc. Furthermore, the taxonomy table 150 may be selected from one or more manufacturer-supplied taxonomy tables or may be custom-developed by a user to suit a particular application.

A set of files (e.g., a data file, a text file, a program file, etc.) is provided and stored in memory (e.g., in a database management system, a federated database management system, a hard drive, a disk, data storage device, etc.) (1002). Each file can have a having a plurality of descriptive and content-based properties (e.g., a file name, a subject, a file type, a file size and other physical statistics, a date/time of creation, a storage location, a last accessed date/time, a last modified date/time, an author, a company, etc.).

Classifiers can be used to process the files into groups and sub-groups based on the different file properties as dictated by the taxonomy table. For example, the classifiers can access each file and determine a predetermined set of properties, e.g., by reviewing a corresponding record of properties for each file to determine the statistics for that file, by using a data mining tool designed to scan and analyze electronic documents to determine the subject matter of the document, etc. The classifiers further generate, deform and modify three-dimensional objects according to these groups and sub-groups.

More particularly, a primary classifier can process the files (at process 1006), according to the selected taxonomy table, by automatically determining a first set of properties (1008), by organizing the files into groups based on the first set of properties and by generating for each file in each group a particular three-dimensional object (e.g., a three-dimensional mesh polygon with multiple nodes for animation capability) (1012-1014). For example, the files in a first group may be represented by a pyramid, the files in a second group may be represented by a building, the files in a third group may be represented by a car, etc.

A secondary classifier can process the files (at process 1016), according to the selected taxonomy table, by automatically determining a second set of properties (1018), by organizing the files in each group into sub-groups based on the second set of properties (1020) and by deforming the three-dimensional objects in each sub-group in a particular manner, as dictated by the taxonomy table (1022). For example, within each group the size, orientation, etc. of each three-dimensional object may be changed to reflect the size, file-type, etc.

Additional classifiers (e.g., a tertiary classifier (at process 1024), a quarternary classifier (at process 1030), an nth degree classifier (at process 1036), etc.) can be used to organize the files into further sub-groups based on additional sets of properties (e.g., third or fourth sets) and to further modify the three-dimensional objects based on these additional sets of properties, as dictated by the taxonomy table. For example, a tertiary classifier can process the files (at process 1024), according to the selected taxonomy table, by automatically determining a third set of properties (1026) for each file in each sub-group, and by modifying the three-dimensional objects in each sub-group in a particular manner, e.g., by varying the color or texture of each object (1028). Similarly, a quarternary classifier can process the files (at process 1030), according to the selected taxonomy table, by automatically determining a fourth set of properties (1032) for each file in each sub-group, and by further modifying the three-dimensional objects in each sub-group in a particular manner, e.g., by varying the color or texture of each object (1034). An $N^{th}$ degree classifier can further process the files (at process 1036), according to the selected taxonomy table, by automatically determining an additional set of properties (1038) for each file in each sub-group, and by further modifying the three-dimensional objects in each sub-group in a particular manner, e.g., by varying sound produced by each object or by animating each object (1040).

Finally, each three dimensional object, as generated by the primary classifier, deformed by the secondary classifier, and modified by the additional classifiers, can be embedded in a three-dimensional environment of a graphical user interface as a selection tool for the file that it represents (1042-1044). Such selections tools are particularly useful in that they provide a user with visual cues regarding the contents of a particular file prior to selection.

Embodiments of the computer implemented method, described above, can take the form of an entirely hardware embodiment, an entirely software embodiment or an embodiment including both hardware and software elements. In one embodiment, the invention is implemented using software, which includes but is not limited to firmware, resident software, microcode, etc. Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Therefore, disclosed herein are a system and computer-implemented method for generating unique three-dimensional objects to represent files in a three-dimensional environment. A primary classifier classifies stored files into groups based on a first set of properties and generates three-dimensional mesh objects to represent each file. The mesh objects are the same within each group and distinguish the files from group to group. The secondary classifier further classifies each group of files into sub-groups based on a second set of properties and deforms the three-dimensional mesh objects in each sub-group in a particular manner to distinguish files from sub-group to sub-group. Additional classifiers modify the deformed mesh object to further distinguish files within each sub-group (e.g., by varying the shape, texture, sound, animation, etc.). Each three-dimensional object can then be embedded into a three-dimensional graphical user interface as a selection tool that provides a user with visual cues regarding the contents of a particular file prior to selection.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A system for automatically generating and displaying three-dimensional objects in a three-dimensional environment of a graphical user interface, said system comprising:
    a memory,
        said memory storing a taxonomy table setting out at least primary classifications based on a first set of properties and secondary classifications within said primary classifications and based on a second set of properties, said taxonomy table further setting out shapes of three-dimensional objects to represent each primary classification and how each of said three-dimensional objects will be deformed to represent each secondary classification, said taxonomy table being one of a pre-programmed taxonomy table and a custom-designed taxonomy table,
        said memory further storing an electronic file having a plurality of properties;
    at least one processor in communication with said memory and comprising:
        a primary classifier generating a particular three-dimensional object to be used as a selection tool for said file, said generating being performed based on said plurality of properties and using said taxonomy table; and
        a secondary classifier in communication with said primary classifier and deforming said particular three-dimensional object in a particular manner, said deforming being performed based on said plurality of properties and using said taxonomy table; and
        a graphical user interface comprising a display displaying said particular three-dimensional object, as generated by said primary classifier and deformed by said secondary classifier, such that said particular three-dimensional object is embedded in said three-dimensional environment of said graphical user interface as said selection tool for said file so as to provide a user with visual cues regarding said file prior to selection.

2. The system of claim 1, said graphical user interface is further configuring said particular three-dimensional object as said selection tool for said file.

3. The system of claim 1, said particular three-dimensional object comprising a three-dimensional mesh polygon.

4. The system of claim 3, said three-dimensional mesh polygon comprising a plurality of nodes that allow said three-dimensional mesh polygon to be animated.

5. The system of claim 1,
    said taxonomy table further setting out tertiary classifications within said secondary classifications and specifying how each of said three-dimensional objects will be modified to represent each tertiary classification, and
    said at least one processor further comprising a tertiary classifier in communication with said secondary classifier and modifying said particular three-dimensional object based on said plurality of properties and using said taxonomy table.

6. The system of claim 5,
    said taxonomy table further setting out quarternary classifications within said tertiary classifications and specifying how each of said three-dimensional objects will be further modified to represent each quarternary classification, and
    said at least one processor further comprising a quarternary classifier in communication with said tertiary classifier and further modifying said particular three-dimensional object based on said plurality of properties and using said taxonomy table.

7. The system of claim 1, said plurality of properties comprising at least one of a file name, a subject, a file type, a file size, a date of creation, a location, a last accessed date, an author and a last modified date.

8. A system for automatically generating and displaying three-dimensional objects in a three-dimensional environment of a graphical user interface, said system comprising:
    a memory,
        said memory storing a taxonomy table setting out at least primary classifications based on a first set of properties and secondary classifications within said primary classifications and based on a second set of properties, said taxonomy table further setting out shapes of three-dimensional objects to represent each primary classification and how each of said three-dimensional objects will be deformed to represent each secondary classification, said taxonomy table being one of a pre-programmed taxonomy table and a custom-designed taxonomy table, and
        said memory further storing a data file containing data having a subject and a plurality of additional properties;
    at least one processor in communication with said memory and comprising:
        a primary classifier generating a particular three-dimensional object to represent to be used as a selection tool for said data file, said generating being performed based on said subject and using said taxonomy table; and
        a secondary classifier in communication with said primary classifier and deforming said particular three-dimensional object in a particular manner, said deforming being performed based on said additional properties and using said taxonomy table; and
        a graphical user to comprising a display displaying said particular three-dimensional object, as generated by said primary classifier and deformed by said secondary classifier, such that said particular three-dimensional object is embedded in said three-dimensional environment of said graphical user interface as said selection tool for said data file so as to provide a user with visual cues regarding said data file prior to selection.

9. The system of claim 8, said graphical user interface is further configuring said particular three-dimensional object as said selection tool for said data file.

10. The system of claim 8, said three-dimensional object comprising a three-dimensional mesh polygon.

11. The system of claim 10, said three-dimensional mesh polygon comprising a plurality of nodes that allow said three-dimensional mesh polygon to be animated.

12. The system of claim 8,
    said taxonomy table further setting out tertiary classifications within said secondary classifications and specifying how each of said three-dimensional objects will be modified to represent each tertiary classification, and said at least one processor further comprising a tertiary classifier in communication with said secondary classifier and modifying said particular three-dimensional object based on said plurality of properties and using said taxonomy table.

13. The system of claim 12,
said taxonomy table further setting out quarternary classifications within said tertiary classifications and specifying how each of said three-dimensional objects will be further modified to represent each quarternary classification, and
said at least one processor further comprising a quarternary classifier in communication with said tertiary classifier and further modifying said particular three-dimensional object based on said plurality of properties and using said taxonomy table.

14. The system of claim 8, said plurality of additional properties comprising at least one of a file name, a file type, a file size, a date of creation, a location, a last accessed date, an author, and a last modified date.

15. A system for automatically generating and displaying three-dimensional objects in a three-dimensional environment of a graphical user interface, said system comprising:
a memory,
said memory storing a taxonomy table setting out at least primary classifications based on a first set of properties and secondary classifications within said primary classifications and based on a second set of properties, said taxonomy table further setting out shapes of three-dimensional objects to represent each primary classification and how each of said three-dimensional objects will be deformed to represent each secondary classification, said taxonomy table being one of a pre-programmed taxonomy table and a custom-designed taxonomy table, and
said memory further storing an electronic file having a plurality of properties;
at least one processor in communication with said memory and comprising:
a primary classifier generating a particular three-dimensional object to be used as a selection tool said file, said generating being performed based on said plurality of properties and using said taxonomy table based on said first set; and
a secondary classifier in communication with said primary classifier and deforming said particular three-dimensional object in a particular manner, said deforming being performed based on said plurality of properties and using said taxonomy table based on said second set; and
a graphical user interface comprising a display displaying said particular three-dimensional object, as generated by said primary classifier and deformed by said secondary classifier, such that said particular three-dimensional object is embedded in said three-dimensional environment of said graphical user interface as said selection tool for said file so as to provide a user with visual cues regarding said file,
said particular three-dimensional object comprising a three-dimensional mesh polygon.

16. The system of claim 15, said graphical user interface further configuring said particular three-dimensional object as said selection tool for said file.

17. The system of claim 15, said three-dimensional mesh polygon comprising a plurality of nodes that allow said three-dimensional mesh polygon to be animated.

18. The system of claim 15,
said taxonomy table further setting out tertiary classifications within said secondary classifications and specifying how each of said three-dimensional objects will be modified to represent each tertiary classification, and
said at least one processor further comprising a tertiary classifier in communication with said secondary classifier and modifying said particular three-dimensional object based on said plurality of properties and using said taxonomy table.

19. The system of claim 18,
said taxonomy table further setting out quarternary classifications within said tertiary classifications and specifying how each of said three-dimensional objects will be further modified to represent each quarternary classification, and
said at least one processor further comprising a quarternary classifier in communication with said tertiary classifier and further modifying said particular three-dimensional object based on said plurality of properties and using said taxonomy table.

20. The system of claim 5, said plurality of properties comprising at least one of a file name, a subject, a file type, a file size, a date of creation, a location, a last accessed date, an author and a last modified date.

* * * * *